Feb. 12, 1946. R. O. MANSPEAKER 2,394,795
SANDWICH COOKY MACHINE
Filed July 16, 1942 3 Sheets-Sheet 1
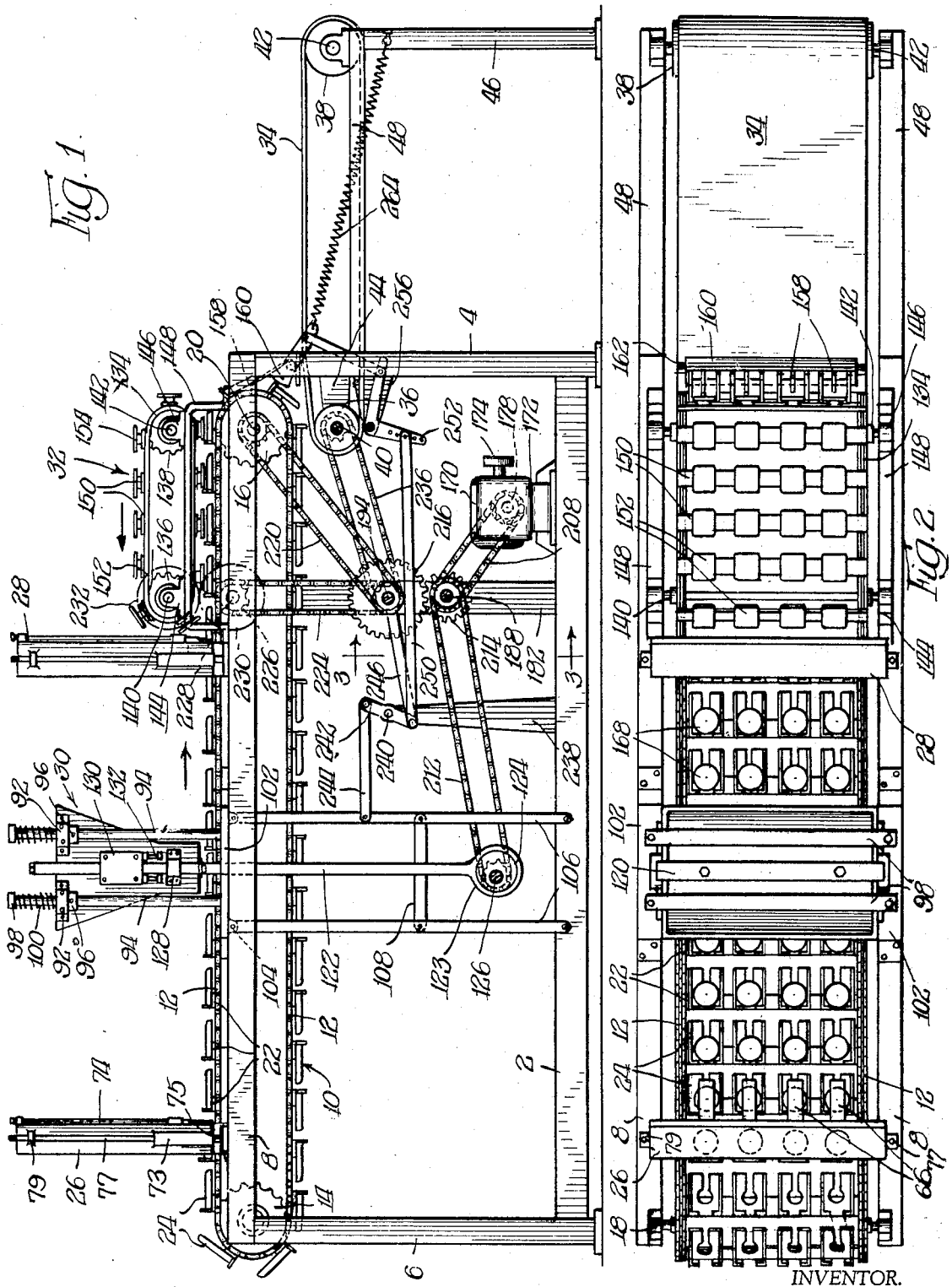
INVENTOR.
Robert O. Manspeaker,
BY
Spencer, Marzall, Johnston & Cook.
ATTYS.

Feb. 12, 1946.    R. O. MANSPEAKER    2,394,795
SANDWICH COOKY MACHINE
Filed July 16, 1942    3 Sheets-Sheet 2
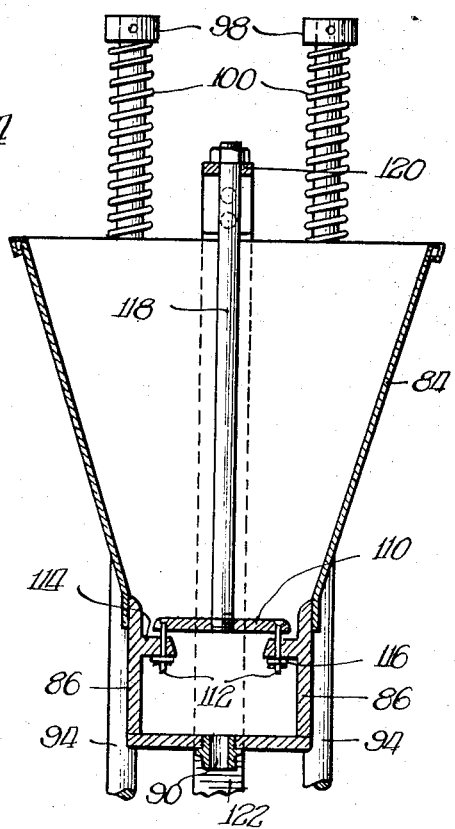
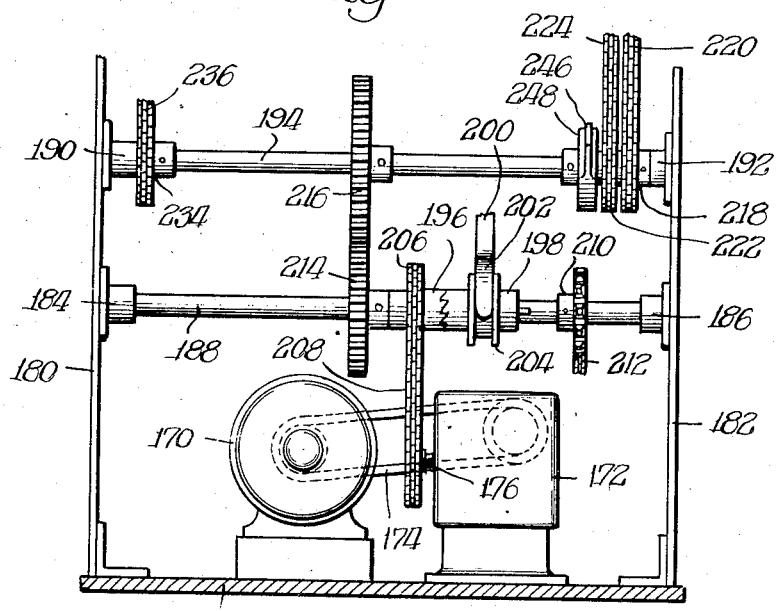
INVENTOR.
Robert O. Manspeaker
BY Feb. 12, 1946.   R. O. MANSPEAKER   2,394,795
SANDWICH COOKY MACHINE
Filed July 16, 1942   3 Sheets-Sheet 3
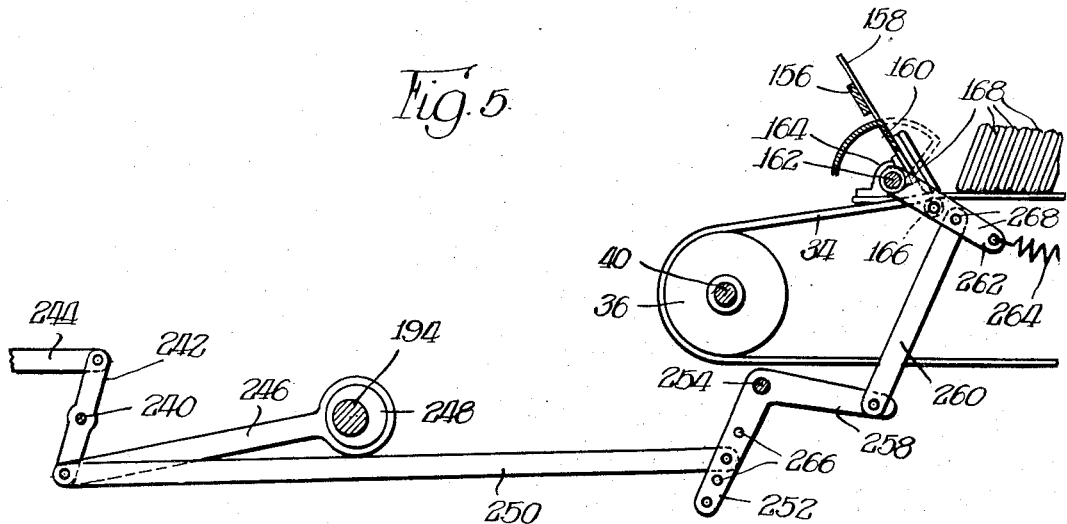
Fig. 5.
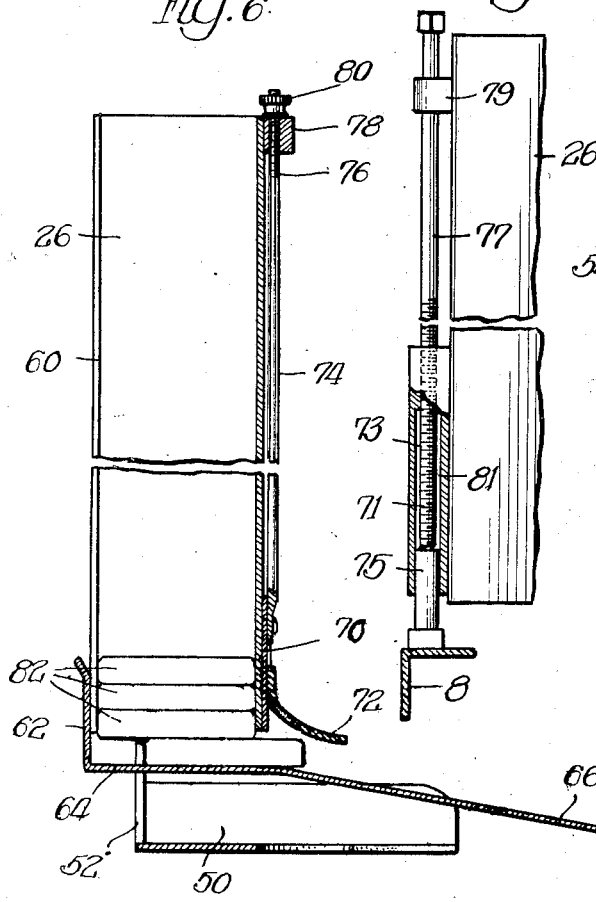
Fig. 6.
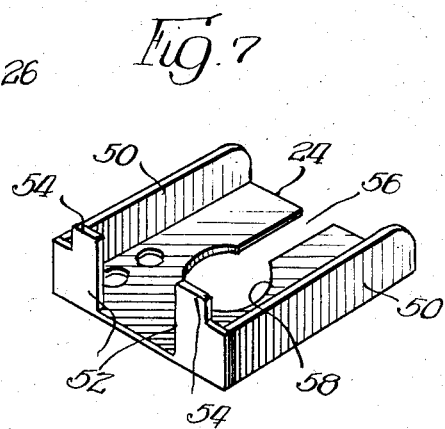
Fig. 7.
Fig. 8.
INVENTOR.
Robert O. Manspeaker,
BY Patented Feb. 12, 1946

2,394,795

UNITED STATES PATENT OFFICE 2,394,795

SANDWICH COOKY MACHINE

Robert O. Manspeaker, Chicago, Ill.

Application July 16, 1942, Serial No. 451,142

4 Claims. (Cl. 107—1)

This invention relates in general to sandwich cooky machines and more particularly to novel mechanisms used in conjunction therewith whereby the wafers and the icing which make up the sandwich cooky are properly placed together and then placed together in a substantially horizontal stack on a conveyor ready for packing.

One of the objects of the present invention is the provision of novel synchronizing means whereby all of the moving parts are actuated in timed relation with each other.

Another object of the invention is to provide improved means for depositing articles such as wafers on the moving conveyor.

A further object of the invention is to provide new and improved means for the dispensing of icing onto wafers or cookies while they are continuously moved on a conveyor.

Still another object of the invention is to provide novel means for applying a slight pressure to the upper wafer of a sandwich cooky after the icing has been deposited between the two wafers so that such icing will be spread out evenly into a thin layer.

A still further object of the invention is to provide means for removing the completed sandwich cooky from the conveyor and placing such cooky onto a second conveyor.

Another and more specific object of the invention is the provision of a plate adjacent one end of the main conveyor which is mounted for reciprocating movement in an arcuate path whereby the completed sandwich cooky may be positively deposited onto the second conveyor which is located closely adjacent thereto.

A still further and more specific object of the invention is to provide means for synchronizing the speed of the second conveyor with that of the first conveyor so that the cookies will be deposited on the second conveyor in a substantially upright position whereby they will be formed into substantially horizontal stacks.

Other objects and advantages of the invention will be apparent by reference to the following description in conjunction with the accompanying drawings in which:

Fig. 1 is a side elevational view of a sandwich cooky machine showing selected embodiments of the invention as mentioned above;

Fig. 2 is a plan view of the machine shown in Fig. 1;

Fig. 3 is a somewhat enlarged fragmentary view of a portion of the machine taken along the plane of line 3—3 in Fig. 1;

Fig. 4 is an enlarged transverse vertical section of the icing dispensing mechanism;

Fig. 5 is an enlarged side elevational view showing the details of the mechanism for removing the cookies from the main conveyor and depositing them on the second conveyor;

Fig. 6 is a vertical section through one of the wafer magazines;

Fig. 7 is an enlarged perspective view of one of the cups on the main conveyor which receive and hold the wafers as they are being formed into sandwich cookies; and Fig. 8 is an enlarged fragmentary elevational view of one end of one of the wafer magazines showing the adjusting means therefor.

Briefly, the machine of this invention includes a main conveyor and a secondary conveyor mounted on suitable frames adjacent each other. The main conveyor is provided with a plurality of wafer receiving cups of an improved type. Located above the main conveyor are two wafer magazines for holding a quantity of wafers, between which magazines is located the icing dispenser. Forwardly of the second wafer magazine is located the means for compressing the wafers together to spread out the icing located therebetween, after which the completed cookies are removed from the main conveyor and deposited on the second conveyor where they are stacked and ready for packing. It is to be noted that novel means have been provided for the purpose of synchronizing the moving parts whereby each is moved in timed relationship to each of the other moving parts.

Referring now more particularly to the drawings and more especially to Figs. 1 and 2, it will be noted that the main frame comprises a base portion 2 having upwardly extending legs 4 at its forward end and similar upwardly extending legs 6 at its rear end. Elongated angle bars 8 connect the upper ends of the forward and rearward legs at each side of the frame respectively. In addition to this, any other suitable or necessary strengthening means can be provided.

A main conveyor generally indicated at 10 is located at the upper side of the frame and particularly includes the spaced apart endless chains 12 which pass around and are moved by the sprocket wheels 14 at the rear of the machine and similar sprocket wheels 16 at the front end of the frame. The rear sprockets 14 are mounted on the shaft 18 while the forward sprockets 16 are mounted on the shaft 20. These shafts 18 and 20 extend between the sides of the frame and are suitably journaled therein for rotative movement.

A plurality of bars 22 extend between the chains and are secured thereto at their ends.

These bars may be of any desired length depending upon the number of sandwich cookies it is desired to form in a line extending from one side of the frame to the other. The cups 24, which receive the wafers, are secured to the bars 22 in spaced apart relation as clearly shown in Fig. 2. An enlarged view of this cup may be seen in Fig. 7. Here again it may be noted that only a single row of these cups extending longitudinally of the frame may be used if desired. However, it is usually preferable to provide a number of these rows in order to increase the output of the machine. Four such rows have been disclosed in the embodiment of the invention shown herein. However, the number of rows is not material and may be varied to suit individual purposes.

It will be noted that the upper and lower runs of the main conveyor described above move in substantially horizontal planes and adjacent the rear end of the conveyor is located the first wafer magazine 26 which is mounted on the frame above the upper run of the conveyor so that wafers stacked therein may be deposited on the cups 24 passing therebelow. Forwardly of the magazine 26 and also located above the conveyor is the second magazine 28 which may contain a stack or stacks of wafers either the same as those in the magazine 26 or different therefrom.

Between the two magazines 26 and 28 the icing dispenser generally indicated at 30 is located so that as the cups move along continuously toward the front of the main frame a wafer is first deposited therein from the magazine 26 after which a selected amount of icing is deposited thereon as it passes beneath the dispenser 30. Then, as the cup continues and moves beneath the magazine 28, a second wafer is deposited thereon thereby forming the completed sandwich cooky.

The means for compressing the two wafers together is generally indicated by the numeral 32 and is mounted on the main frame forwardly of the second wafer magazine 28. After the second wafer has been deposited in the cup the compressing means exert a slight pressure on the upper wafer thereby forcing the icing outwardly into a thin layer.

A second conveyor 34 is mounted closely adjacent the main conveyor 10 at the forward end thereof so that the completed sandwich cooky may be deposited thereon and carried away. The conveyor 34 is preferably of the belt type and passes around a drum 36 at its rear end and another drum 38 at its forward end. The drum 36 is mounted for rotation on a shaft 40, while the drum 38 is similarly mounted for rotation on a shaft 42. The shaft 40 is supported by suitable brackets 44 mounted on the main frame, while the shaft 42 is journaled by any suitable means to the forward end of an auxiliary frame, one end of which is made up of the vertical legs 4 of the main frame and the other end of which consists of the vertical supports 46. This frame is completed by the elongated frame members 48 which connect the supports 46 to the legs 4 at each side of the frame.

The details of the wafer magazine and the cups will now be described, reference being had particularly to Figs. 6 and 8. It will be noted that the cups 24 are provided with upwardly extending side flanges 50 and upwardly extending spaced apart flanges 52 at the rear thereof. These rear flanges 52 are each provided with a shoulder whereby an upwardly extending finger 54 is provided on each side of the space therebetween. The bottom of the cup is provided at its forward edge with a slot 56 which extends inwardly toward the center thereof and terminates in an enlarged substantially circular opening 58. Inasmuch as the wafer rests in the cup when the icing is deposited thereon, the opening 58 is provided for the purpose of preventing loss of icing if it so happens that there is no wafer in the cup at the time icing is dispensed into it. In such case, the icing will pass through the opening 58 and may be received by any suitable means provided therebelow.

The two magazines 26 and 28 are substantially the same and a description of one will suffice for both. In Fig. 6 it will be noted that the magazine 26 consists of substantially parallel front and rear walls 60, these walls being suitably connected together at their ends to form an enclosure within which wafers, cookies or the like may be stacked in individual compartments. These magazines are of such a width as to support as many stacks of wafers as there are rows of cups; in this instance, four. At the bottom of the magazine a combination support and guideway is provided which consists of a rear upwardly extending portion 62 secured to the back wall of the magazine. The portion 62 extends below the bottom of the magazine and is continued forwardly in a substantially horizontal plane as shown at 64. This portion forms the support for the bottom wafer of the stack as shown. The support 64 is then continued in a forwardly and downwardly direction as at 66 and terminates in a substantially horizontal portion 68, these latter two portions forming the guideway. The width of each guideway is such that the flanges 52 and fingers 54 of the cup members will pass on each side thereof. Thus far then it will be evident that as a cup is moved beneath the magazine the fingers 54 will pass on each side of the support 64, thus contacting at least the lowermost wafer of the stack, whereupon this wafer will be moved forwardly and will pass down the guideways 66 and 68 whereupon it will be deposited into the cup. In the case of round wafers the portions 52 and 54 will also act as centering means to center the wafers in the cup thus performing a dual function. The object of moving the wafer down an inclined guideway before it is placed in the cup is to prevent breakage thereof since some wafers are extremely fragile an if dropped from any great distance may be broken.

At the front of the magazine a gate 70 is mounted which has a baffle 72 secured thereto which is curved outwardly and downwardly to prevent the wafer from turning over. The gate 70 is secured by any suitable means to a vertical rod 74 which is provided with theads 76 at its upper end and passes through an opening in a block 78. A nut 80 threadedly engages the upper protruding end of the rod 74 whereby rotation of the nut 80 will raise or lower the gate 70. This regulation of the gate is for the purpose of adjusting the size of the opening through which the wafer passes down the guideway so that no more than one wafer will be removed if they are very thin or if more than one wafer is desired to be removed at one time the gate may be elevated, thus making the opening larger. The wafers are indicated in Fig. 6 by the numeral 82.

Since the fingers 54 always remain at a fixed height above the main frame, I provide adjusting means for the magazines to regulate the number of wafers to be withdrawn therefrom. This adjusting means is located at each end of each magazine and, referring to Fig. 8, comprises a block 71 secured to the magazine and provided with a vertical threaded opening 73 throughout the length thereof, as shown. The block 71 receives within the lower end of the opening 73, an upwardly extending rod 75 which, in turn, is secured to the main frame member 8. The rod 73 is only long enough to extend part of the way through the opening. An elongated bolt 77 passes freely through a support 79 at the upper part of the magazine and is threaded at its lower end as at 81 to engage the threads of the opening 73 in the block 71. In the lowermost position of the magazine the opening 73 will receive the full length of the rod 75, however, as the bolt 77 is moved downwardly it will contact the upper end of the rod 75. Continued downward movement of the bolt, then, will force the block 71, and the magazine to which it is attached, upwardly. Thus the magazine can be adjusted with respect to the cups so that only one or a plurality of wafers will be contacted by the fingers 54, withdrawn and deposited in the cup.

Referring now to Figs. 1 and 4, the preferred embodiment of the icing dispensing mechanism is disclosed wherein there is provided a hopper 84 within which the icing is located. The lower end of the hopper is provided with substantially vertical side walls 86 and a bottom 88 in which there is provided a plurality of spaced apart openings 90 usually equal to the number of rows of sandwich cookies to be formed. On the outside of the hopper at each end thereof there are provided two spaced apart brackets 92 provided with openings for the reception of the rods 94. While the particular number of these rods may be varied to suit the size of the hopper, I have preferred to show four of them in this particular embodiment. Each rod is provided with a nut 96 located immediately below each of the brackets 92 whereby the hopper is supported thereon. Each of the forward and rearward pairs of rods 94 is connected together by means of a transversely extending bar 98 secured to the upper end thereof as clearly shown in Fig. 2. Each rod is also provided with a coiled spring 100 which extends between the brackets 92 and the transverse rod 98 whereby the hopper is yieldably held downwardly against the nuts 96.

The lower ends of the rods 94 at each end of the hopper are secured by any suitable means to a bar, preferably an angle bar 102, the horizontal leg of which is adapted to rest on the connecting member 8 at each side of the main frame. Each bar 102 is provided with downwardly extending ears 104 to which are secured the legs 106. These legs extend downwardly within the confines of the main frame and may be made rigid by any suitable means, such as the cross pieces or braces 108. It will therefore be evident that the hopper mechanism indirectly rests on the main frame and if desired may be moved longitudinally thereof by reason of the relationship between the bars 102 at each side of the hopper and the upper connecting means 8 at each side of the main frame.

Within the hopper itself and in the lower part thereof a plate 110 is positioned which has a plurality of downwardly extending pins 112 which freely pass through openings in a ring-like member 114. Each pin is provided near its lower end with an enlargement or any other suitable stop means 116 to thereby limit the downward movement of the ring-like member 114 on the pins 112. It is necessary that the ring-like member 114 have a peripheral contour similar to that defined by the sides and ends of the lower part of the hopper so that it will fit snugly thereagainst. In the normal relationship between the plate 110 and the ring-like member 114 as shown in Fig. 4 there is a considerable space between the two members to permit icing to pass through such space below the plate. It will be evident therefore that such a space between the two members will be present if the plate is moved upwardly. However, when the plate 110 is moved downwardly the space between the plate 110 and the bottom of the hopper 88 being filled with icing, the space between the plate 110 and the ring-like member 114 will be closed, and the icing below the plate 110 will then be forced outwardly through the openings 90.

The plate 110 is provided throughout its length with a plurality of openings which threadedly engage a similar number of upwardly extending rods 118. These rods 118 extend above the upper edge of the hopper 84 and are connected together at their upper ends by means of a cross bar 120 which extends outwardly beyond each end of the hopper 84 where each end thereof is secured to a substantially vertical elongated bar 122. Each bar 122 extends downwardly within the main frame and terminates in a yoke or bifurcated portion 123. Eccentrics 124 are mounted on a shaft 126 which is disposed horizontally near the bottom of the main frame and is suitably journaled in bearing members at each side thereof. Each eccentric 124 is provided with a circumferential groove of slightly greater width than the yoke 123 on the lower end of each bar 122 and is adapted to receive the yoke therein. As is usual in similar constructions of this nature, a suitable member is adapted to complete the circle surrounding the eccentric member and connect together the two ends of the yoke 123 whereby a rotation of the shaft and eccentric secured thereto will effect a longitudinal as well as a lateral movement of each of the bars 122. Suitable means is provided for rotation of the shaft which will be explained more fully hereinafter.

A cross bar 128 is secured to each of the elongated bars 122 at a point thereon above the main conveyor and above the cross bar 128 a plate 130 is secured to each end of the hopper 84 in spaced relation thereto. A pair of bolts 132 extend downwardly from the bottom edge of each plate 130 and threadedly engage blocks mounted thereon whereby they may be adjusted toward or away from the cross bar 128. The space between each plate 130 and the end of the hopper to which it is attached is sufficient to permit reception of the bar 122 and permits a sliding movement thereof within such space.

It will be evident that a vertical reciprocation of the bars 122 due to the eccentric movement of their lower ends will impart a similar vertical reciprocation to the plate 110 mounted within the hopper and the ring 114 carried thereby. As has been explained before, on each upward movement of the plate 110, due to the upward movement of the bars 122, a space will be provided between the plate 110 and the ring 114 suspended therefrom to thereby permit a quantity of icing or filling to pass below the plate 110. Likewise, a downward movement of the bars 122 will close the space between the plate 110 and the ring 114 and will result in an extrusion of the filling through the openings 90 in the bottom of the hopper. Likewise, upon each upward movement of the bars 122, the cross bars 128 secured thereto will come against the ends of the bolts 132 and elevate the hopper for a portion of the upward stroke of the bars 122 due to the connection of the bolts to the hopper through the plates 130. It will be evident then that a manipulation of the bolts 132 will regulate the amount of filling to be extruded through the openings 90 each time the bars 122 are reciprocated. Explaining this operation more fully, it will be clear that during the initial upward movement of the bars 122 the plate 110 will be moved with respect to the hopper and if this distance is sufficiently great the ring 114 will also be moved upwardly with respect to the hopper. However, after the cross bars 128 reach the bolts 132 any further upward movement of the bars 122 will also effect a movement upwardly of the hopper 84. Therefore, after the cross bars 128 reach the bolts 132 there will be no further relative movement between the plate 110 and the ring 114 carried thereby and the hopper 84. Likewise, during the downward movement of the bars 122 the plate 110, the ring 114, and the hopper 84 will all move in unison until the brackets 92 reach the nuts 96 on the rods 94. When this point is reached, however, the bars 122 will not have completed their downward movement and for the rest of the movement downwardly the plate 110 will move relative to the hopper and during this movement will extrude filling or icing through the openings 90. By adjusting the bolts 132 toward or away from the cross bars 128, the distance through which the plate 110 will move relative to the hopper can be varied and it will be obvious that the greater the downward movement of the plate 110 relative to the hopper 84, the greater will be the amount of filling extruded. The hopper also moves longitudinally of the main conveyor 10; however, this mechanism will be explained more fully hereinafter.

The conveyor mechanism which operates to press the wafers of the sandwich cookies together to thereby spread the filling therebetween into a thin layer is mounted above the main conveyor adjacent the forward end thereof and includes the spaced apart sprocket chains 134, each of which passes around a sprocket wheel 136 at the rear end thereof and a sprocket wheel 138 at the forward end thereof. The rear sprocket wheels 136 are suitably mounted on a horizontal shaft 140 for rotation therewith, while the forward sprocket wheels 138 are similarly mounted on a horizontal shaft 142, which shafts are suitably journaled respectively in the rear bearing members 144 and front bearing members 146, which in turn are mounted in spaced relation to the main frame and thereabove on the bracket 148 located at each side of the main frame. A plurality of spaced apart cross bars 150 extend between the two sprocket chains 134 and are secured thereto at their ends. Each bar 150 has mounted thereon a plurality of spaced apart plates 152, the number of such plates on any one bar being equal to the number of rows of cups 24. It is preferable that these plates 152 be resiliently or yieldably mounted on the cross bars 150 so that they will not exert an excess pressure on the upper wafers of the sandwich cookies. The plates may be yieldably mounted in any suitable and recognized manner, such as by means of the compression springs 154 which, in this case, extend outwardly at the desired locations on the bars 150 and have the plates 152 secured to their outer ends.

This conveyor mechanism which carries the plates 152 is mounted for movement in a vertical plane and in a direction opposite to the movement of the main conveyor 10 and is spaced above the main conveyor a suitable distance so that as the cups 24 continue in their forward movement along the main conveyor with the completed sandwich cookies therein a row of plates 152 will meet a similar row of sandwich cookies as they pass beneath the conveyor mechanism carrying the yieldably mounted plates. Since the main conveyor and this secondary conveyor mechanism move at substantially the same speeds, the plates 152 will exert a slight pressure on the upper wafer of each sandwich cooky and will move forwardly therewith, such pressure being just sufficient to spread the filling into a thin layer but not great enough to break the wafers.

After the sandwich cookies have been completely formed and have passed beneath the conveyor mechanism wherein the filling is pressed into a thin layer, novel means are provided for removing the completed sandwiches from the main conveyor and suitably stacking them on a belt conveyor from which they can be removed by hand and placed in suitable packages. The means which I have provided for removing the sandwiches from the main conveyor consists of a bar 156 which extends laterally of the main frame and is rigidly secured thereto. Spaced apart through the length of this bar 156 I provide a plurality of fingers 158 which are angularly mounted, as clearly shown in Fig. 5. The fingers 158 are of a width which may be received within the slot 56 of the cups 24, and I provide the same number of fingers as there are rows of cups 24. These fingers extend upwardly adjacent the forward end of the main conveyor and as the cups with the sandwiches therein are moved downwardly at the end of the main conveyor the slots 56 of the cups receive the fingers 158 which, in effect, lift the sandwiches out of the cups as they continue their downward movement and direct them away from the main conveyor toward the belt conveyor 34.

Throughout all of these operations it should be remembered that the wafers which make up the sandwiches are fragile and should be carefully handled to prevent breakage. It is therefore not practical to permit the wafers or sandwiches to drop onto the belt conveyor 34 from any great distance but rather should be deposited thereon in a gentle manner. To aid in depositing the sandwiches onto the belt conveyor to prevent breakage thereof, I provide a plate 160 which extends transversely of the main frame and which is mounted closely adjacent the upper run of the belt conveyor 34. This plate is secured to a transversely extending rock shaft 162 which is suitably journaled in bearings 164 at each side of the main frame. I also provide an idler roller 166 which also extends between the sides of the main frame and immediately below the upper run of the belt conveyor 34. This idler roller is positioned closely adjacent the rotary reciprocating plate 160, thereby enabling the point of the belt conveyor 34 on which the sandwiches are deposited to be located as closely as possible to the depositing plate 160. The completed sandwich cookies are indicated in Fig. 5 by the numeral 168, and it will be noted that as a sandwich is removed from the main conveyor by a finger 158 it slides downwardly across the finger and across the plate 160, which is normally in alignment therewith. As the sandwich continues to slide downwardly, the lower edge thereof will come against the upper run of the belt conveyor 34 which is moving toward the right as viewed in Figs. 1 and 5. The bottom edge of the sandwich will then start to be carried away. However, at this moment an arcuate movement of the plate 160 will move the upper edge of the sandwich also toward the right tending to deposit the sandwich on the conveyor in a substantially upright position. It is to be noted that the belt conveyor 34 is designed to move at a slower rate of speed than the main conveyor 10, which results in a stacking of the sandwiches on the belt conveyor 34 in a substantially horizontal plane.

Having described the various mechanisms and parts of the entire machine which cooperate to form and deliver sandwiches or sandwich cookies, reference is now made more particularly to Figs. 1 and 3 wherein the driving and synchronizing mechanisms are disclosed. A motor 170 is mounted on the base 2 of the main frame and is connected in the usual manner to a gear reduction box 172 by means of a belt or chain drive 174. A shaft 176 extends outwardly from one side of the gear box and is provided with a sprocket wheel 178 which is secured thereto. At each side of the main frame additional bracing members 180 and 182 extend vertically between the upper and lower members of said main frame and are suitably secured thereto. A pair of bearing members 184 and 186 are mounted respectively on the braces 180 and 182 and have journaled therein the ends of the lower shaft 188. Likewise, a second pair of bearing members 190 and 192 are secured to the braces and rotatably support an upper shaft 194.

The motor 170 is run continuously and for this reason I provide on the lower shaft 188 a clutch mechanism so that the various parts of the machine can be operated when desired by manipulation of the clutch. While this clutch may assume any of the well-known forms, the type which I show herein consists of a toothed sleeve member 196 loosely mounted for rotation on the shaft 188 which comprises one portion of the clutch. Opposed to the member 196 is the other part of the clutch which consists of a second toothed sleeve member 198 which is keyed to the shaft 188 and is adapted to be slidable longitudinally thereof for engagement or disengagement with the member 196. A lever 200 is provided with a lower bifurcated end 202 which is adapted to fit into a grooved wheel 204 which is secured to or may be made an integral part of the clutch member 198. When the two clutch members are disengaged it will be clear that the part 196 will rotate continuously about the shaft 188. However, when it is desired to cause rotation of this shaft, the lever 200 is manipulated to move the second clutch member 198 toward the first clutch member so that the teeth thereon will engage each other and form a driving connection between the two parts. Since the member 198 is keyed to the shaft 188, its rotation will be imparted to the shaft. The clutch member 196 has secured thereto a sprocket wheel 206 which is connected by means of the sprocket chain 208 to the pulley 178 on the gear box shaft 176, whereby continuous operation thereof is effected.

Rotation of the shaft 126, to which are secured the eccentrics 124 which cause reciprocation of the bars 122, is effected by means of a sprocket wheel 210 secured to the shaft 188, which is connected by means of the sprocket chain 212 to a suitable sprocket mounted on the shaft 126 (not shown). When the clutch members are in engagement and the shaft 188 is rotated, these connecting means will cause a rotation of a shaft 126 to thereby effect operation of the hopper dispensing means.

Also mounted on the shaft 188 is a gear 214 which meshes with another gear 216 mounted on the upper shaft 194 whereby engagement of the clutch mechanism through the rotation of shaft 188 will thereby cause a rotation in the opposite direction of the upper shaft 194. Movement of the main conveyor 10 is caused by the rotation of the upper shaft 194 by reason of a sprocket wheel 218 mounted thereon which is connected by means of the sprocket chain 220 to a similar sprocket wheel mounted on the shaft 20. As has been explained hereinbefore, the sprocket wheels 16 at the forward end of the main conveyor are mounted on the shaft 20 so that upon rotation of the shaft 194 and the chain 220 the shaft 20 will be rotated.

The conveyor mechanism which carries the yieldable plates for compressing the sandwich wafers together is actuated by means of a sprocket wheel 222 also mounted on the shaft 194 which has a sprocket chain 224 connecting said sprocket wheel with a second sprocket wheel 226 mounted on the shaft 228 (see Fig. 1). The shaft 228 extends horizontally between the upper side members of the main frame and is suitably journaled in bearing members thereon. Rotation of the shaft 194 through the sprocket chain 224 will thereby cause rotation of the shaft 228. The gear 230 is also mounted on the shaft 228 and meshes with the gear 232 mounted on the rear shaft 140 of the conveyor mechanism carrying the presser plates. Since the driving sprocket wheels 136 are also mounted on the shaft 140, it will be evident that this conveyor mechanism will be moved in a direction opposite to that of the main conveyor 10 so that the lower run of the conveyor mechanism 32 will move in the same direction and at the same rate of speed as the upper run of the main conveyor 10.

The belt conveyor 34 is also driven from the shaft 194 through the medium of the sprocket wheel 234 mounted thereon and a sprocket chain 236 which connects the wheel 234 to a similar sprocket wheel (not shown) mounted on the shaft 40. Since the drum 36 of the belt conveyor is also mounted on the shaft 40, rotation of the shaft 194 will cause movement of the belt conveyor 34.

Shaft 188, as viewed in Fig. 1, is mounted for counterclockwise rotation and therefore imparts a counterclockwise rotation to the shaft 126 and its connected parts. Through the gears 214 and 216, mounted respectively on the lower shaft 188 and the upper shaft 194, said upper shaft will be rotated in a clockwise direction. The shaft 194 being directly connected with the driving shafts of the main conveyor 10 and the belt conveyor 34, rotation thereof in a clockwise direction will cause movement of the upper runs of said conveyors toward the right as viewed in Fig. 1. Similarly, the shaft 228 will have a clockwise rotation. However, since it imparts movement to the shaft 140 of the conveyor mechanism 32 through the medium of the gears 230 and 232, said shaft 140 will move in a counterclockwise direction, thereby moving the conveyor mechanism 32 in a direction opposite to that of the main conveyor 10 to thereby effect the results mentioned above.

It is essential in the operation of my machine that all of the various operations be synchronized. For example, the hopper must move forwardly with a row of cups a short distance at the same speed as the cups and, moreover, must be synchronized to dispense a quantity of filling or icing onto the wafers in these cups during each forward movement thereof. Furthermore, immediately upon the completion of a dispensing operation the hopper must be returned to its original position and be in readiness to deposit filling onto the next successive row of cups. After the sandwiches have been completed and compressed, the mechanism which operates to positively deposit them onto the belt conveyor 34 must be actuated only when a sandwich or a row of sandwiches has been directed thereto from the main conveyor. The mechanism by which these various operations are synchronized will now be described.

Referring now particularly to Figs. 1 and 5, a suitable support 238 extends upwardly from the base of the main frame member and is provided with a pivot pin 240 which supports an arm 242 at substantially the center thereof. The upper end of the arm 242 is pivotally secured to a link 244 which extends rearwardly and is pivotally connected with one of the downwardly extending legs 106 of the hopper carriage. An arm 246 is pivotally connected to the opposite end of the arm 242 and terminates in a yoke which spans a grooved eccentric 248 mounted for rotation with the shaft 194. The construction of this arm and eccentric is substantially the same as that described hereinbefore with respect to the bars 122. Suffice it to say, however, that a rotation of the shaft 194 will cause a rotation of the eccentric 248 and a longitudinal reciprocation of the arm 246.

Also connected to the lower end of the arm 242 is a forwardly extending link 250 which is pivotally connected at its opposite end to one arm 252 of a bell crank lever, which in turn is mounted for pivotal movement at the point 254 on a suitable bracket 256. The other arm 258 of the bell crank lever is pivotally connected with an upwardly extending link 260 which in turn has its upper end pivotally secured to an arm 262. This last-named arm has one end thereof connected to the rock shaft 162 so that an arcuate reciprocating movement of the arm 262 will cause rotation of the rock shaft 162. The outer end of the arm 262 is provided with a tension spring 264 to aid in preventing movement of the arm 262 past dead center.

From the foregoing it will be obvious that continuous rotation of the shaft 194 will result in a longitudinal reciprocating movement of the arm 246, which in turn, through its connection with the arm 242, will cause a longitudinal reciprocating movement of the link 244, the link 244 being connected to the hopper carriage will thereby effect a reciprocation of the hopper longitudinally of the main conveyor. Since this reciprocation of the hopper is caused by rotation of the shaft 194, which in turn drives the main conveyor 10, the forward movement of the hopper will thereby be synchronized with the movement of the main conveyor. It will likewise be evident that the reciprocating motion of the arm 246 will cause a similar movement in the link 250, thereby causing the plate 160 to assume its dotted line position as shown in Fig. 5 through the links 260 and 262 and the bell crank lever to which the links 250 and 260 are connected. This forward movement of the plate 160 will take place each time the arm 242 moves in a clockwise direction. Simultaneously with each forward movement of the plate 160 which deposits a sandwich on the conveyor 34, as explained hereinbefore, the hopper will also be moved forwardly and dispense a quantity of filling onto the wafers in any particular row of cups.

Summarizing the operation of the machine in its entirety, assuming the magazines 26 and 28 are filled with the desired wafers out of which the sandwiches are to be made and assuming further that the hopper contains a sufficient amount of icing or filling of any other desired character, the clutch mechanism on the shaft 188 is thrown into engagement, thereby effecting rotation of this shaft and the upper shaft 194. The movement of the main conveyor 10 is then begun, the cups mounted thereon first passing beneath and withdrawing a wafer from the magazine 26. At the same time the synchronizing mechanism above described will cause vertical reciprocation of the plate 110 within the hopper 84 to thereby extrude filling into the cups thereneath. Simultaneously with each extrusion operation, the hopper will be moved forwardly for a short distance at the same rate of speed as the conveyor so that the filling can be deposited on the wafers during continuous movement of said conveyor. After the filling has been deposited on the bottom wafer the cups pass beneath the magazine 28 where the upper wafer is deposited thereon. Immediately beyond the second magazine, the cups with the sandwiches therein pass below the conveyor mechanism 32, the movement of which has been synchronized with the movement of the main conveyor, as explained above. The yieldable plates 152 on said conveyor mechanism exert a slight pressure on each of the upper wafers of the sandwiches so that the filling therein will be spread outwardly into a thin and even layer. The actual formation of the sandwich having been completed, the cups within which they are located continue to move around the end of the main conveyor where the slot 56 in each cup receives one of the fingers 158. The sandwich is thus remover from the cup and directed toward the belt conveyor 34. However, in its passage downwardly toward the belt conveyor, each sandwich passes across the face of the plate 160 and as soon as its bottom edge reaches the belt conveyor the plate 160 is moved forwardly to deposit the sandwich in a substantially upright position. The belt conveyor moving at a slower rate of speed than the main conveyor will permit the sandwiches deposited thereon to be stacked horizontally substantially as shown in Fig. 5. From the conveyor the sandwiches may then be removed and packaged.

In certain instances it may be desirable to vary the arcuate stroke of the plate 160 and in order to alter this movement I provide a series of openings 266 in the arm 252 of the bell crank lever. The pivot at the forward end of the link 250 is adapted to fit into any one of these openings and thereby vary the distance through which the plate 160 moves. To supplement this means I have also provided a series of similar openings 268 in the arm 262 for the reception of the pivot pin located on the upper end of the arm 260.

While the description of this invention has been primarily directed to the manufacture of sandwiches or sandwich cookies, it is to be understood that this machine can be used equally as well for the stacking and packaging of wafers or other similar flat objects which have not been made into sandwiches. For example, if it is desired to package a series of plain wafers of different kinds, the hopper could be dispensed with as well as the conveyor mechanism 32 and, if further desired, more than two wafer magazines could be located above the main conveyor. In instances of this kind each cup would remove a wafer of different character from each magazine and then deposit a plurality of them on the belt conveyor to be stacked and removed for packaging.

It is also to be understood that I do not wish to be limited to the making of sandwich cookies which involve the use of sweet wafers with an icing therebetween, since my invention is equally well adapted for use in making sandwiches of other types wherein a filling other than a sugar icing is to be used and wherein wafers of a different character, for example crackers, may be used.

Having thus described the invention, what I claim as new and desire to secure by Letters Patent of the United States is:

1. In a machine of the class described, the combination with a main endless belt conveyor for carrying a plurality of substantially flat objects, of a second endless belt conveyor adjacent one end of said main conveyor, means projecting into the path of said objects while they are being carried by said main conveyor to remove said objects from said main conveyor and direct them toward said second conveyor, and means reciprocable in an arcuate path between said first means and said second conveyor to deposit said objects onto said second conveyor.

2. In a machine of the class described, the combination with a main moving conveyor for carrying a plurality of substantially flat objects, of a second moving conveyor adjacent one end of said main conveyor, a plate mounted for reciprocating movement in an arcuate path closely adjacent the upper run of said second conveyor, a finger disposed between said plate and the end of said main conveyor to lift said objects from said main conveyor and direct them toward said second conveyor across said plate, and means for moving said plate through a predetermined arc each time one of said objects moves across said plate to thereby deposit the object onto said second conveyor.

3. In an apparatus of the character described, a conveyor travelling in a substantially fixed closed path in a vertical plane and including a plurality of individual spaced receiving and discharging cups carried upon the upper surface thereof, means for depositing articles in said cups at a predetermined point in the upper part of said fixed closed path intermediate the ends of said conveyor, said cups being open at their front ends for discharging said articles upon reaching one end of the conveyor and said cups having an opening in the bottom thereof extending longitudinally and rearwardly from the front end of each cup, and means at the discharge end of said conveyor projecting through the opening in the bottom of each cup successively as said cup passes over said discharge end of the conveyor thereby to facilitate the removal of the articles carried by said cups.

4. In an apparatus of the character described, a conveyor travelling in a substantially fixed closed path in a vertical plane and including a plurality of individual spaced receiving and discharging cups carried upon the upper surface thereof, means operatively associated with said cups to deposit articles in said cups at a predetermined point in the upper part of said fixed closed path intermediate the ends of said conveyor, said cups being open at their front ends for discharging said articles upon reaching one end of the conveyor and said cups having an opening in the bottom thereof extending longitudinally and rearwardly from the front end of each cup, and means at the discharge end of said conveyor projecting through the opening in the bottom of each cup successively as said cup passes over said discharge end of the conveyor thereby to facilitate the removal of the articles carried by said cups, said discharge means comprising a member sloping downwardly away from the discharge end of said conveyor to support and guide the discharged articles.

ROBERT O. MANSPEAKER.